United States Patent Office 3,168,501
Patented Feb. 2, 1965

3,168,501
CYCLIZED ALPHA OLEFIN COPOLYMERS
AND PROCESS
Stanley Tocker, Wilmington, Del., assignor to E. I. du
Pont de Nemours and Company, Wilmington, Del., a
corporation of Delaware
No Drawing. Filed Jan. 27, 1959, Ser. No. 789,274
9 Claims. (Cl. 260—85.3)

This invention relates to organic polymers derived from olefins and more particularly to novel highly crystalline organic polymers derived from olefins and to a process for preparing such polymers.

The olefin polymers, and especially the alpha olefinic hydrocarbon polymers, are assuming increasing importance in such fields as packaging films, laminates, coatings, moldings, and the like. The range of properties of the polyolefins are, in general, well suited for these purposes. However, there are some respects in which the polyolefins have short-comings. In particular, in the utilization of polyolefins in the field of packaging films, for example, difficulties are experienced in arriving at a suitable balance of properties so that there may be obtained a film stiff enough to run well on bag-making and printing machines of the trade, and at the same time a film that is readily heat sealable and has adequate durability and resistance to impact for low temperature uses to which the packaged article may be subjected. Accordingly, improvements in these respects continue to be sought.

In my copending application Serial No. 789,273, filed January 27, 1959, now abandoned, there is described and claimed a series of novel, highly crystalline, substantially linear polymers derived from the copolymerization of a straight chain alpha olefin having from 2 to 10 carbon atoms with a conjugated diene. These polymers are comprised essentially of the recurring groups A and at least one of the recurring groups B and C where recurring group A is —CHR—CH$_2$—, B is

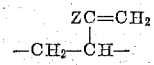

and C is

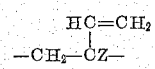

wherein R is selected from the group consisting of hydrogen and alkyl groups of 1 to 8 carbon atoms and Z is a radical selected from the group consisting of methyl, ethyl, propyl, chlorine, fluorine, acetoxy, chloroacetoxy, butyroxy and cyano radicals. These polymers are further characterized by a structural arrangement wherein the residual carbon-to-carbon unsaturation is located predominantly in pendant ethylenic groups attached to the main polymer chain with no more than 1 mol percent of residual unsaturation located in the main polymer chain. In film form such polymers, in general, exhibit a higher tensile strength, a higher tear strength and a higher pneumatic impact strength than do the corresponding alpha olefin homopolymers and hence constitute an improvement over films of the corresponding olefin homopolymers for packaging purposes. Moreover, because of the low degree of residual unsaturation in the main polymer chain, these polymers are not easily degraded and thus may be subsequently modified by appropriate reaction to further improve certain properties thereof.

An object of the present invention, therefore, is to provide novel, highly crystalline polymers from the polymers of my aforesaid invention, which in film form exhibit enhanced physical and chemical characteristics. A further object is to provide a treatment for the polymers of my aforesaid invention whereby to produce novel polymers of superior physical and chemical properties. These and other objects will more clearly appear from the description which follows.

The foregoing and related objects are realized by the present invention which, briefly stated, comprises subjecting a substantially linear polymer comprising the recurring groups A and recurring groups selected from the group consisting of groups B and C, where A is a group of the formula —CHR—CH$_2$— wherein R is a radical selected from the group consisting of hydrogen and straight chain alkyl radicals having 1 to 8 carbon atoms, B is a group of the formula

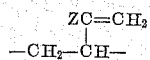

and C is a group of the formula

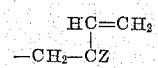

wherein Z is a radical selected from the group consisting of methyl, ethyl, propyl, chlorine, fluorine, acetoxy, chloroacetoxy, butyroxy and cyano radicals, groups A comprising from 99% to 75% by weight of the total number of recurring groups and groups from the group consisting of groups B and C comprising from 1% to 25% by weight of the recurring groups, said polymers containing no more than one mol percent of residual carbon-to-carbon unsaturation located in the main polymer chain, and having an inherent viscosity above 0.3, to the action of a condensing agent of the class consisting of cationic and peroxidic agents, whereby to form highly crystalline polymers comprising essentially 99 to 75 weight percent of a recurring group A of the formula —CHR—CH$_2$— wherein R is a radical selected from the group consisting of hydrogen and straight chain alkyl radicals having 1 to 8 carbon atoms, and from 1 to 25 weight percent of recurring groups of the group consisting of groups D, E, F and G of the formula

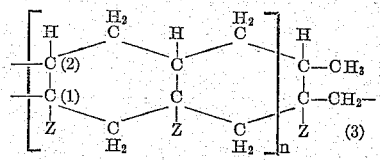

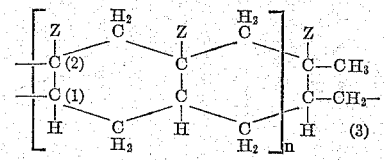

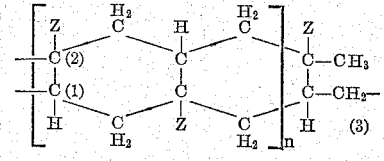

and

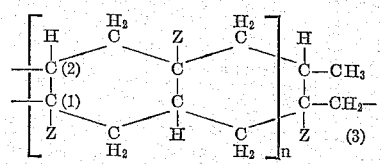

respectively, wherein $n$ is an integer and Z is a radical selected from the group consisting of methyl, ethyl, propyl, chlorine, fluorine, acetoxy, chloroacetoxy, butyroxy and cyano radicals, wherein the unsatisfied valence at position (3) is satisfied by attachment to a recurring group A, the unsatisfied valences at positions (1) and (2)

are satisfied by attachment of a recurring group A together with attachment of a hydrogen atom or by formation of a terminating double bond between the positions (1) and (2), said polymer having an intrinsic viscosity above 0.3.

The polymers which serve as the starting materials from which the products of the present invention are produced may be prepared by copolymerizing from 99 to 75 weight percent of at least one straight chain alpha olefin having 2 to 10 carbon atoms, e.g., ethylene, with from 1 to 25 weight percent of at least one conjugated diene of the formula $CH_2=CH-CR'=CH_2$ wherein $R'$ is a radical selected from the group consisting of methyl, ethyl, propyl, chlorine, fluorine, acetoxy, chloroacetoxy, butyroxy and cyano radicals, e.g., isoprene, in a liquid halogenated hydrocarbon such as chlorobenzene, at a temperature of from $-30°$ C. to $10°$ C. and in the presence of catalytic amounts of a catalyst formed from the reaction of a reducible polyvalent metal compound containing at least one metal of the group consisting of metals of Groups IVa, Va and VIa of the Periodic Table, iron, cobalt, copper, nickel and manganese, said metal having directly attached thereto at least one substituent from the group consisting of halogen, oxygen, hydrocarbon and —O—hydrocarbons, with preferably not more than three fold molar amount of reducing compound to reduce the valence of the metal component, said reducing compound being selected from the group consisting of metal hydrides and compounds having a metal of Groups I, II and III of the Periodic Table, said metal being above hydrogen in electromotive series and attached directly through a single bond to a carbon atom selected from the group consisting of trigonal carbon and tetrahedral carbon. A preferred catalyst is that formed from the reaction between vanadyl chloride and not more than three fold molar amount of triisobutyl. After the reaction has been continued for a suitable length of time effective to yield a copolymer having an inherent viscosity of at least 0.3, the reaction is terminated by the introduction of alcohol or a solution of a water-miscible alcohol and water. The product is purified by washing with a mixture of 3% concentrated hydrochloric acid in methanol and 20% water in methanol, and finally with methanol, after which it is dried.

In the preferred embodiment of this invention a copolymer prepared, in the manner above described, from 90 to 99 weight percent of ethylene and from 10 to 1 weight percent of isoprene is cyclized to a polymeric composition essentially free of olefinic unsaturation and containing cyclohexane units. The cyclization is carried out in a solvent, preferably chlorobenzene, in the presence of phosphorus oxychloride or boron trifluoride and for the most part at room temperature. Completion of cyclization may be insured by briefly heating the reaction mixture to $100°-120°$ C., after which the reactants are cooled to precipitate the product, the product is washed with methanol and dried in a vacuum oven. It can then be formed into a shaped product or article by any of the methods well known in the art.

The cyclization may be carried out under the influence of any of the group of cationic and peroxidic agents. Examples of cationic agents that may be used include, in addition to boron trifluoride, aluminum trichloride, aluminum tribromide, titanium tetrachloride, stannic chloride, ferric chloride, stannous chloride, beryllium chloride, zinc chloride, aluminum triiodide, hydrogen fluoride, sulfuric acid, phosphoric acid and polyphosphoric acid. As peroxidic agents suitable for purposes of this invention there may be mentioned di-tertiary butyl peroxide, ethyl hydroperoxide, dimethyl dioxide, dipropyl dioxide, benzoyl peroxide, lauroyl peroxide, t-butyl perbenzoate, isopropyl percarbonate, peracetic acid, methyl ethyl ketone peroxide, cyclohexanone peroxide, t-butyl peracetate and dibenzoyl diperoxide. The cyclization may be carried out over a range of temperatures, e.g., from room temperature or below, up to temperatures of the order of $125°$ C., the specific range usually being determined by the particular catalyst employed.

Various solvents may be employed for the cyclization reaction. Thus, hydrocarbons such as benzene, toluene, o-xylene, cyclohexane, halogenated hydrocarbons such as chlorobenzene, bromobenzene, o-dichlorobenzene, tetrachloroethylene, and heterocyclics such as tetrahydrofuran and thiophene are operable.

Cyclization of the polymer is presumed to take place through condensation of adjacent unsaturated groups appended to the main polymer chain. The formula shown below illustrates a product obtained by treatment of an ethylene/isoprene copolymer, for example, with a suitable condensing agent or initiator,

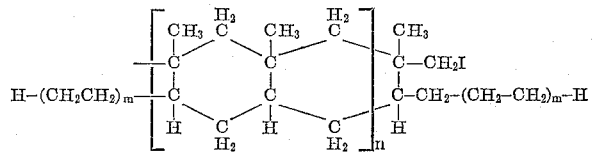

wherein $m$ and $n$ are integers and I is an initiator fragment, displaceable by a hydrogen atom.

The copolymers treated as described above are characterized by essesntial absence of unsaturation; they remain soluble through repeated cycles of precipitation from solution and redissolving; films from the treated copolymers show increased toughness and rigidity, a feature shown by polymers with bulky ring structures attached. The cyclized products show higher melting points than the uncyclized products and the level of crystallinity is increased from a minimum of 50% to a minimum of 60% for the cyclized products.

Most of the lateral unsaturation consists of isopropenyl groups and since these are arranged predominantly as block units, cyclization is considered to give cyclized groups of the type shown. Two or more adjacent isoprene units in the copolymer are required for cyclization; in the unusual case where only two units are adjacent, an isolated six-membered ring is obtained, with more than two adjacent units, fused six-membered ring systems are obtained, as shown.

The following examples will serve to further illustrate the principles and practice of my invention.

EXAMPLE 1

A copolymer of ethylene and isoprene was prepared as follows:

To 1.0 liter of stirred chlorobenzene, purified by distillation over calcium hydride, there was added under nitrogen 4 ml. (4 mmols) of vanadyl chloride ($VOCl_3$) and 12 ml. (12 mmols) of 1.0 M aluminum triisobutyl. The nitrogen flow was stopped and simultaneously ethylene at 175 cc. (.008 mol)/min. and isoprene solution (30 ml. diluted in 100 ml. with chlorobenzene) at 0.5 ml. (.001 mol)/min. were passed into the reactor held at $5°$ C.–$10°$ C. The reaction was carried out for 3 hours after which the product was washed successively in an Osterizer with (a) 3% concentrated hydrochloric acid in methanol, (b) 20% water in methanol, and (c) methanol, and the resulting powder was then dried at $50°$ C. in a vacuum oven.

Infrared analysis showed the material to be a 10:1 weight ratio ethylene/isoprene copolymer. The ratio of isopropenyl to vinyl groups in the total unsaturation content was determined to be 16:1, as indicated by absorption at 888 cm.$^{-1}$ characteristic of isopropenyl and at 993 cm.$^{-1}$ and 910 cm.$^{-1}$ characteristic of vinyl, and there was no detectable (less than 1.0 mol percent) in-chain unsaturation. An X-ray diffraction pattern showed the copolymer to have a level or crystallinity of at least 60%; the copolymer had two sharp melting points, $130°$ C. and $135°$ C., indicating further its highly crystalline nature, and an inherent viscosity at 0.1% solids in alpha-chloronaphthalene at $150°$ C. of 4.8.

Boron trifluoride was bubbled at 50 ml./min. through 1.5 liters of chlorobenzene for 3 minutes at 25° C. To the resultant solution there was added with stiring 5.0 g. of the ethylene/isoprene copolymer prepared as above described. The stirred mixture was heated to 50° C. under nitrogen and an additional 20 ml. of gaseous boron trifluoride was bubbled in. The temperature of the mixture was then raised to 120° C. for 3 minutes after which it was allowed to cool. After the mixture had cooled the product which separated was filtered and purified by washing with copious quantities of methanol in an Osterizer and was dried at 50° C. in a vacuum oven. The composition showed a sharp melting point of 146° C., indicating it to be highly crystalline. Infrared analysis showed no detectable olefinic unsaturation. Its inherent viscosity at 0.1% solids in alpha chloronaphthalene at 150° C. was 6.1.

"Inherent viscosity" is defined by L. H. Cragg, J. of Colloid Science I, 261–269 (1946).

$$\text{Inherent viscosity} = \frac{\ln N_r}{c}$$

wherein "ln" is the natural logarithm, "$N_r$" is the viscosity of the solution relative to the solvent and "c" is the concentration expressed in grams of solute/100 ml. of solvent. As used herein, inherent viscosity is determined at 0.1% solids in alpha-chloronaphthalene at 150° C.

EXAMPLE 2

One gram of the polymer prepared as described in Example 1 was dissolved in 250 ml. of tetrachloroethylene, which was heated under nitrogen at 100° C. To this solution was added 3.0 ml. of phosphorous oxychloride and the solution was stirred for 15 minutes at 100° C. The reactants were allowed to cool, and the polymer which precipitated was washed with copious amounts of methanol in an Osterizer before drying. Infrared analysis showed complete disappearance of the appended vinyl and isopropenyl groups characteristic of the starting material. The polymer had a sharp melting point of 146° C.; indicating its highly crystalline nature; its inherent viscosity was 5.8.

EXAMPLE 3

Five grams of finely divided ethylene/isoprene copolymer prepared as in Example 1 was swollen in 1.5 l. of stirred tetrachloroethylene at 90° C. under nitrogen. A solution of 2.0 ml. of phosphorus oxychloride in 25 ml. of the solvent was added dropwise to the reactor over a period of 3.0 minutes, and the resultant mixture was stirred for 3.0 minutes at 90° C. The polymer was purified by washing in an Osterizer with methanol and overnight vacuum oven drying at 50° C. Infrared analysis showed complete elimination of lateral unsaturation with no indication of isomerization of the double bonds in the appended groups toward the main polymer chain. Elemental analysis showed no chlorine to be present.

A similar reaction was carried out except that 5.0 ml. of phosphorus oxychloride was used. The infrared spectrum was nearly identical with that obtained above.

EXAMPLE 4

Five grams of the ethylene/isoprene copolymer described in Example 1 was dissolved in 1.5 l. of chlorobenzene at 110° C. under nitrogen. A solution of 0.2 ml. of di-tert-butyl peroxide in 25 ml. of chlorobenzene was added to the above solution over a 15 minute period under nitrogen. The mixture was stirred for 5 minutes; after cooling and purification by washing with methanol, the polymer was dried at 50° C. overnight in a vacuum oven. The infrared scan showed nearly complete elimination of the lateral unsaturation.

Examination of the crystalline melting points of the several cyclized products from preceding Examples 1, 2 and 3 showed that the X-ray spectrogoniometer diffraction peaks at 22° and the unusually large peak at 24° both disappear at 146° C. For polyethylene, which has a correspondingly small 24° peak, peaks disappear at 134°–135° C.; for the uncyclized ethylene/isoprene copolymers with primarily lateral unsaturation, the 22° peak disappears at 135° C. and the 24° peak is removed at 130° C. This information provides additional evidence for cyclization, i.e., a crystalline system unlike polyethylene or the usual crystalline pattern from ethylene copolymers was obtained. The degree of crystallinity for the cyclized products was indicated to be at least 60%. The products are soluble in typical solvents such as toluene or o-xylene; they can be precipitated and readily redissolved which behavior would be unlikely if the products were cross-linked.

Physical properties of the films prepared from the products represented in the foregoing examples, by pressing a one inch square sample at 150° C. —0.5 minute at 30 tons, are shown in the table below.

*Physical properties*

|  | Cyclized Ethylene/Isoprene Copolymer (Example 3) | Ethylene/Isoprene Copolymer (Example 1 F–770–A) | Linear Polyethylene (Control) |
| --- | --- | --- | --- |
| Modulus (p.s.i.) | 112,500–131,000 | 74,000 | 120,000 |
| Elongation (percent) | 84–115 | 150 | 100–500 |
| Tenacity (p.s.i.) | 6,300–9,500 | 4,600 | 3,000 |
| Tear (g./mil) | 62–68 | 171 | 50–100 |
| Pneumatic Impact (kg.-cm./mil) | 5.3–6.8 | 3.6 | 2.0 |

The increased toughness (impact) and stiffness (modulus) of the cyclized product is further indication of polymer chains with bulky ring structures attached.

The various properties listed in the table above and in the foregoing examples are defined below.

PNEUMATIC IMPACT STRENGTH

Pneumatic impact strength is the energy required to rupture a film. It is reported in kilograms-centimeters/mil of thickness of the film sample. Pneumatic impact strength is determined by measuring the velocity of a ball mechanically accelerated by air pressure, first in free flight and then in flight immediately after being impeded by rupturing the test film sample. In this test, the film sample is 1¾" x 1¾". The projectiles are steel balls ½" in diameter and weighing 8.3 grams. The free flight ball velocity is 40±2 meters/second. The velocities are measured by timing photoelectrically the passage of the steel balls between two light beams set a definite distance apart. The pneumatic impact strength is measured by the loss in kinetic energy of the ball due to the rupturing of the film sample. It is calculated from the following formula:

Constant × (square of velocity in free flight minus square of velocity in impeded flight)

where the constant is directly proportional to the weight of the projectile and inversely proportional to the acceleration due to gravity. This test is carried out at 23° C. and 50% relative humidity, and the test samples are conditioned for 24 hours at 23° C. and 50% relative humidity.

TENSILE STRENGTH, ELONGATION AND INITIAL TENSILE MODULUS

These measurements are made at 23° C. and 50% relative humidity. They are determined by elongating the film sample (samples are cut with a Thwing-Albert Cutter which cuts samples ¼" wide) in an Instron tensile tester at a rate of 100%/minute until the sample breaks. The force applied at the break in lbs./sq. in. (p.s.i.) is the tensile strength. The elongation is the percent increase in the length of the sample at breakage. Initial tensile modulus in p.s.i. is directly related to film stiffness. It is obtained from the slope of the stress/strain curve at an elongation of 1%; both tensile strength and initial tensile modulus are based upon the initial cross-sectional area of the sample.

TEAR STRENGTH

Tear strength is measured on an Elmendorf tester. A film is cut to form sample strips of 2.5" x 5.0" each. Ten such strips from each direction, i.e., 10 having the longer dimension running in the machine direction or the direction in which the film was extruded or calendered, and 10 having the longer dimension running in a direction transverse to the machine direction, are conditioned and tested at 75° F. and 35% relative humidity. The tester consists of a stationary jaw and a movable jaw mounted on a pendulum swinging on a substantially frictionless bearing and equipped with a means for measuring the maximum arc through which the pendulum will swing. The force required to extend the initial tear is measured by determining the work done in tearing the film through a given distance. The work is determined from the difference in the swing of a pendulum, first free and then impeded by tearing the film. Auxiliary weights may be added to the pendulum when the tear strength of a single sheet of film exceeds the capacity of the pendulum alone. The scale of the Elmendorf tester, a standard instrument of the paper industry, reads in terms of grams/1.69" of tear/16 sheets. Since 10 sheets are used in the present test, the values obtained from the tester must be corrected and are then converted to grams/1.69" of tear/mil of thickness.

INFRARED

The infrared examinations were carried out on a Perkin-Elmer Model 21 Infrared Spectrophotometer and a Perkin-Elmer Infracord Infrared Spectrophotometer, following procedures previously described.[1]

The primary advantage in the products of this invention lies in the superior combination of film properties that are attainable with these polymeric compositions. Films formed from the cyclized products not only are higher melting and have greater stiffness, along with such durability characteristics as higher tenacity and impact resistance, than the non-cyclized copolymers as well as non-modified polyethylene films, but they also retain essentially the excellent elongation and tear characteristics representative of polyolefin films.

Further, these structures are essentially free of residual unsaturation, which obviates the tendency toward degradation through points of unsaturation that is characteristic of various modified polyolefins, particularly those copolymerized with conjugated dienes, wherein the residual unsaturation is generally located in the main polymer chain. Moreover, the polymeric products are highly crystalline and are thus amenable to various orienting treatments to further enhance their strength characteristics.

I claim:

1. Highly crystalline polymers consisting essentially of the recurring group A and recurring groups selected from the class consisting of groups D, E, F and G where A is a group of the formula —CHR—CH$_2$— wherein R is a radical selected from the group consisting of hydrogen and straight chain alkyl groups of 1 to 8 carbon atoms, and D, E, F and G are groups of the formula

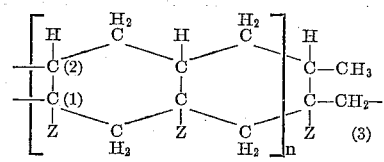

[1] Wm. D. Bryant and R. C. Voter, Journal of the American Chemical Society, 75, 6113 (1953); F. W. Billmyer "Text Book of Polymer Chemistry," Chapter 7, Interscience Publishers, 1957.

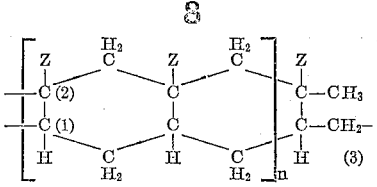

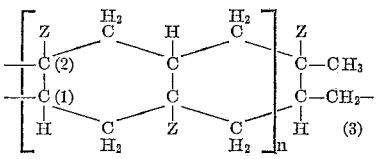

and

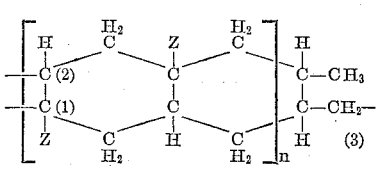

respectively, wherein Z is a radical selected from the group consisting of methyl, ethyl, propyl, chlorine, fluorine, acetoxy, chloroacetoxy, butyroxy and cyano radicals, groups A constituting from 99% to 75% by weight of the total number of recurring groups, and groups from the class consisting of groups D, E, F and G constituting from 1% to 25% by weight of the recurring groups wherein $n$ is an integer and the unsatisfied valence at position (3) is satisfied by attachment to a recurring group A, the unsatisfied valences at positions (1) and (2) are satisfied by attachment of a recurring group A and attachment of a hydrogen atom or by formation of a terminating double bond between the positions (1) and (2), said polymers having an inherent viscosity above 0.3 as measured at 0.1% solids at 150° C. in alpha-chloronaphthalene.

2. The polymers of claim 1 in the form of film.

3. Highly crystalline polymers consisting essentially of the recurring group A and recurring groups selected from the class consisting of groups D, E, F and G where A is a group of the formula —CH$_2$—CH$_2$—, and D, E, F and G are groups of the formula

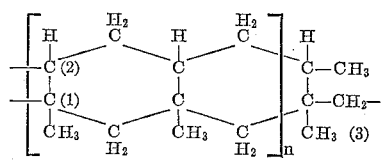

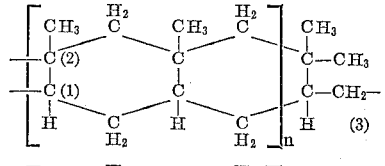

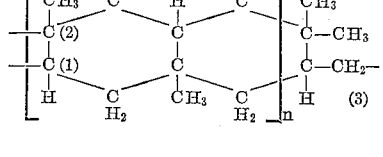

and

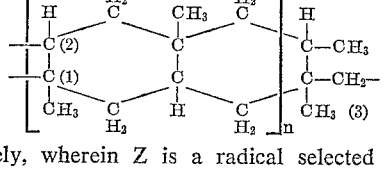

respectively, wherein Z is a radical selected from the group consisting of methyl, ethyl, propyl, chlorine, fluorine, acetoxy, chloroacetoxy, butyroxy and cyano radicals, groups A constituting from 99% to 75% by weight of the total number of recurring groups, and groups from the class consisting of groups D, E, F and G constituting from 1% to 25% by weight of the recurring groups wherein $n$ is an integer and the unsatisfied valence at position (3) is satisfied by attachment to a recurring group A, the unsatisfied valences at positions (1) and (2) are satisfied by attachment of a recurring group A and attachment of a hydrogen atom or by formation of a terminating double bond between positions (1) and (2), said polymers having an inherent viscosity above 0.3 as measured at 0.1% solids at 150° C. in alpha-chloronaphthalene.

4. The polymers of claim 3 in the form of film.

5. The process which comprises subjecting highly crystalline, substantially linear polymers consisting essentially of the recurring groups A and recurring groups selected from the class consisting of groups B and C, where A is a group of the formula —CHR—CH$_2$— wherein R is a radical selected from the group consisting of hydrogen and straight chain alkyl radicals having 1 to 8 carbon atoms, B is a group of the formula

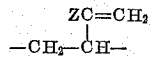

and C is a group of the formula

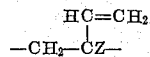

wherein Z is a radical from the group consisting of methyl, ethyl, propyl, chlorine, fluorine, acetoxy, chloroacetoxy, butyroxy and cyano radicals, groups A constituting from 99% to 75% by weight of the total number of recurring groups, and groups from the class consisting of groups B and C constituting from 1% to 25% by weight of the recurring groups, said polymers containing no more than one mol percent of residual carbon-to-carbon unsaturation located in the main polymer chain and having an inherent viscosity above 0.3, to the action of a condensing agent selected from the group consisting of cationic and peroxidic agents.

6. The process of claim 5 wherein R is hydrogen.

7. The process of claim 6 wherein Z is a methyl radical.

8. The process of claim 5 wherein the condensing agent is boron trifluoride.

9. The process of claim 5 wherein the condensing agent is phosphorus oxychloride.

References Cited in the file of this patent

UNITED STATES PATENTS

| | | |
|---|---|---|
| 2,387,989 | Foster | Oct. 30, 1945 |
| 2,403,649 | Frey | July 9, 1946 |
| 2,625,523 | Garber | Jan. 13, 1953 |
| 2,846,427 | Findlay | Aug. 5, 1958 |
| 2,899,417 | Hooker | Aug. 11, 1959 |
| 2,927,105 | Nienburg | Mar. 1, 1960 |
| 2,962,479 | Aldridge et al. | Nov. 29, 1960 |
| 2,968,650 | Baxter et al. | Jan. 17, 1961 |

FOREIGN PATENTS

| | | |
|---|---|---|
| 538,782 | Belgium | Apr. 2, 1956 |

OTHER REFERENCES

Barron: Modern Rubber Chemistry, Van Nostrand Co. (N.Y., 1948), pages 76–77.